United States Patent [19]
Odachi et al.

[11] Patent Number: 5,617,003
[45] Date of Patent: Apr. 1, 1997

[54] METHOD AND APPARATUS FOR CHARGING A BATTERY OF AN ELECTRIC VEHICLE

[75] Inventors: Yasuharu Odachi; Norimoto Minoshima, both of Aichi-ken, Japan

[73] Assignee: Kabushiki Kaisha Toyoda Jidoshokki Seisakusho, Kariya, Japan

[21] Appl. No.: 621,024

[22] Filed: Mar. 22, 1996

[30] Foreign Application Priority Data

Mar. 24, 1995 [JP] Japan .................................... 7-066470
Jun. 28, 1995 [JP] Japan .................................... 7-162522

[51] Int. Cl.$^6$ .......................... H02J 7/00; H01M 10/44; H01M 10/46
[52] U.S. Cl. ................................................................ 320/2
[58] Field of Search ................................ 320/2; 307/9.1, 307/10.1

[56] References Cited

U.S. PATENT DOCUMENTS

| | | | |
|---|---|---|---|
| 4,347,472 | 8/1982 | Lemelson | 320/2 |
| 4,496,896 | 1/1985 | Melocik et al. | 320/2 |
| 4,800,328 | 1/1989 | Bolger et al. | 320/2 |
| 5,252,078 | 10/1993 | Langenbahn | 320/2 X |
| 5,272,431 | 12/1993 | Nee | 320/2 |
| 5,306,999 | 4/1994 | Hoffman | 320/2 |
| 5,311,973 | 5/1994 | Tseng et al. | 320/2 X |
| 5,498,948 | 3/1996 | Bruni et al. | 320/2 |

*Primary Examiner*—Peter S. Wong
*Assistant Examiner*—Patrick B. Law
*Attorney, Agent, or Firm*—Brooks Haidt Haffner & Delahunty

[57] ABSTRACT

Method and apparatus of charging a battery of an electric vehicle through inductive coupling between a primary inductive device having a core and a primary coil connected to a power source and a secondary inductive device having a core and a secondary coil connected to the battery are disclosed. The primary inductive device is provided on a movable arm of a ground charger unit and the secondary inductive device is mounted on the bottom of the vehicle adjacent its rear end. The power source supplies to the primary coil selectively a charging current and a check current. When the check current is supplied to the primary coil, an electromotive force is induced in the secondary coil which varies with a change of the relative position between the primary and secondary inductive devices. The variation in the induced electromotive force causes a change of the check current flowing in the primary coil. The position where the primary inductive device should be placed with respect to the secondary inductive device just before coupling thereof is determined on the basis of the change of the check current which is monitored while moving the primary inductive device relative to the secondary inductive device.

15 Claims, 10 Drawing Sheets

METHOD AND APPARATUS FOR CHARGING A BATTERY OF AN ELECTRIC VEHICLE

BACKGROUND OF THE INVENTION

The invention relates generally to a method and apparatus for charging a propulsion battery of an electric vehicle. More specifically, the invention is directed to a method and apparatus for positioning a primary core-coil device of a inductive type battery charging system with respect to a secondary core-coil device of the same system and also to an apparatus for practicing the method.

A battery charging system plays a key role for utilization of electric vehicles and ease of handling the charging system helps to make the electric vehicle acceptable to and popular among prospective users. Therefore, a battery charging system easy to use is strongly demanded by the electric vehicle market.

Battery charging systems designed to facilitate the positioning of a primary core-coil device on a vehicle with respect to a ground secondary core-coil device have been disclosed heretofore by various prior art publications such as laid-open publications of Japanese unexamined patent applications Nos. 63-87136 and 3-155338 and laid-open publication of Japanese unexamined utility model application No. 1-79343.

In the charging system disclosed by the first publication No. 63-87136, an electric vehicle is driven to a predetermined position defined by wheel stops located in a garage so as to position a secondary core-coil device carried by the vehicle in confronting relation to a primary core-coil device of a battery charging apparatus installed on the garage floor. The correct position where the vehicle should be stopped for the charging operation is detected by a sensor and the charging apparatus is initiated automatically in response to a signal generated by the sensor. Thus, the vehicle driver can be freed from troubling to connect the primary core-coil device of the charging apparatus with the secondary core-coil device on the vehicle.

According to the charging apparatus disclosed by the publication No. 3-155338, the vehicle is driven carefully so that a secondary core-coil device on the vehicle is brought in abutment with a primary core-coil device of the ground charging apparatus. When such abutment is detected by a sensor, the charging apparatus is operated to flow electric current in the primary coil to initiate battery charging. With this apparatus, the vehicle driver does not have to manually connect the primary and secondary inductive devices.

According to the publication No. 1-79343, the vehicle is driven by the driver to a position where a secondary core-coil device mounted on the bottom of the vehicle is brought into alignment with a primary core-coil device which is placed on the floor of a parking location in a garage. When the alignment is detected by a proximity switch, the ground charging apparatus is operated to start the battery charging operation.

With any of the above-described charging apparatuses, the range of permissible crosswise distances within which the vehicle should be parked for successful coupling of the inductive core-coil devices is too small and, therefore, it is required that the driver should manipulate the steering wheel laboriously while driving the vehicle to guide it precisely to its charging position where the secondary core-coil device is set in alignment with the primary core-coil device. As a matter of course, this driving for positioning of the inductive devices calls for driving skill of the driver and consumes a lot of time before the vehicle can be properly located with respect to the ground primary core-coil device.

Additionally, the above prior art apparatuses use a costly sensor and its associated equipment. Furthermore, the prior art systems have a problem in that the ground chargers are subjected to rain fall.

SUMMARY OF THE INVENTION

Therefore, an object of the invention is to provide a method and apparatus which expedite positioning of the primary core-coil device with respect to the secondary counterpart without requiring driving skill of the driver and using an additional sensor and its relevant equipment.

Another object of the invention is to provide a method and apparatus which provide a wider range of permissible distances within which the vehicle should be parked for coupling of the inductive core-coil devices.

Still another object of the invention is to provide a water-proof apparatus for positioning the primary core-coil device.

According to one embodiment of the present invention, in an apparatus for charging a battery of an electric vehicle by coupling a primary inductive device having a core and a primary coil connected to a power source, with a secondary inductive device having a core and a secondary coil connected to the battery on the vehicle and then flowing a charging current in the primary coil thereby to induce an electromotive force in the secondary coil, there is provided means for supplying an electric current to the primary coil and means for moving the primary inductive device relative to and past the secondary counterpart. By moving the primary inductive device past the secondary inductive device, a current with variable value is induced in the secondary coil depending on the spaced distance between the primary and secondary inductive devices. That is, as the primary device comes close to the secondary device, the above distance is reduced and electromagnetic induction occurs between the two inductive devices, as a result of which an electric current is induced in the secondary coil. This induced or secondary current is increased with a decrease in the spaced distance and the primary current flowing in the primary coil is reduced by an amount corresponding to the current induced in the secondary coil. Apparently, the current flowing in the primary coil becomes minimum when the primary inductive device is positioned substantially closest to the secondary inductive device. In order to monitor this change, the apparatus further comprises means for monitoring a change of the electric current flowing in the primary coil. In locating the primary inductive device at a position where it is closest to the secondary inductive device, the primary device is moved and stopped at the target position on the basis of information of the change in the current flowing in the primary coil. For this purpose, the apparatus further comprises control means which is operable from the above information to control the operation of the moving means so as to bring the primary inductive device to the target position. The position where the primary inductive device should be stopped for positioning may be calculated by the control means on the basis of two positions of the primary inductive device relative to said secondary counterpart where the primary current in the coil becomes greater and smaller than a predetermined level of current, respectively.

According to the invention, the monitoring means may be adapted to detect a change of voltage across the primary coil.

Furthermore, it may be contemplated to provide monitoring means for detecting a change of electric current or voltage induced in the secondary coil and varying with the movement of the primary inductive device relative to the secondary device.

The method of charging a battery of an electric vehicle according to the invention is performed according to the same principle as described in the above. That is, the primary inductive device is moved relative to the secondary inductive device while monitoring a change of electric current or voltage in the secondary coil caused by an induced electromotive force in the secondary coil varying with the movement of the primary inductive device, and stopping the primary inductive device at a position where the primary device is located substantially closest to the secondary inductive device on the basis of information of the change of electric power in the primary coil.

In another embodiment of the invention, the primary inductive device is movable over a distance of stroke between two opposite stroke ends and is initiated to move from one of the stroke ends to widen the permissible distance within which the vehicle should be parked.

The above and other objects and features of the invention will be apparent from the following detailed description of preferred embodiments of the invention in conjunction with the accompanying drawings.

DESCRIPTION OF PREFERRED EMBODIMENTS

Figure 1:
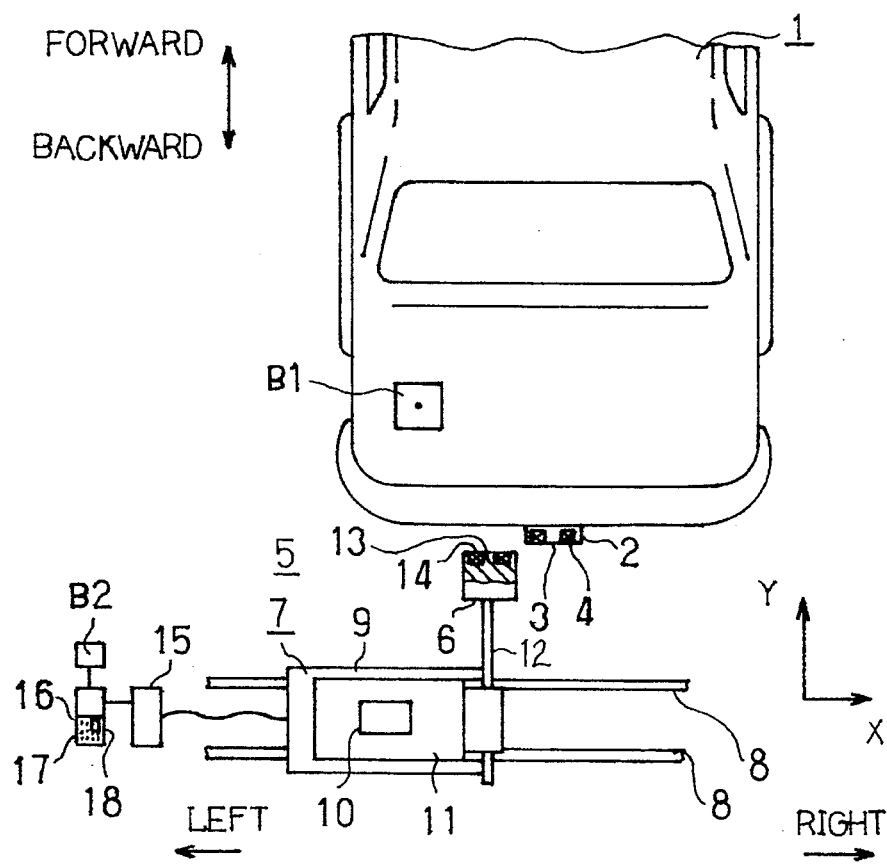
FIG. 1 is a plan view showing an electric vehicle parked in a garage and a preferred embodiment of an apparatus for positioning a primary inductive device according to the present invention.
Figure 2:
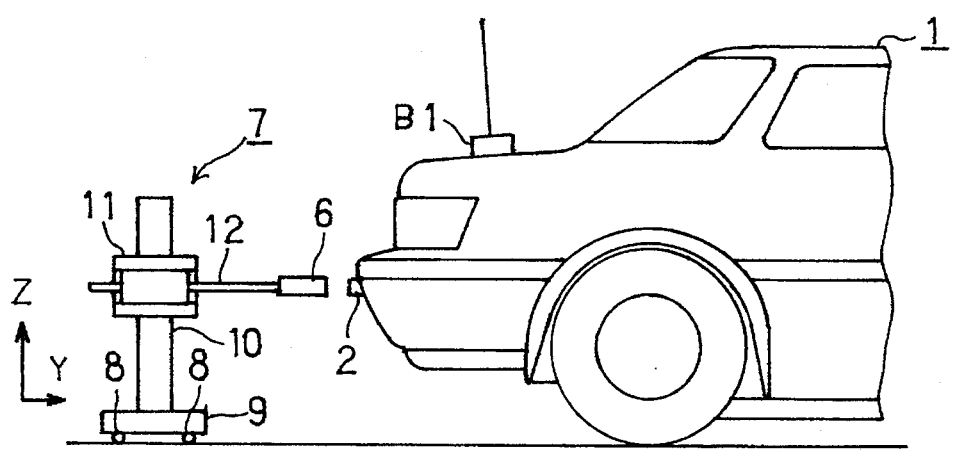
FIG. 2 is a side view of the electric vehicle and the positioning apparatus of FIG. 1.

Referring firstly to FIGS. 1 and 2, there is shown an electric vehicle 1 parked in a garage 5. The vehicle 1 carries therein a propulsion battery (not shown) and at the rear thereof a power receiving or secondary inductive device 2 comprising a core 3 and a coil 4 which is connected through any appropriate electric circuit to the battery. As shown in FIG. 1, the secondary inductive assembly 2 is disposed with the axis of the coil 4 extending in the longitudinal direction of the vehicle 1. The vehicle 1 further has a wireless signal transmitter B1.

In the garage 5 is located a stationary vehicle charger including a power source unit 15 connected at the input thereof to a control unit 16 and at the output to a primary coil 14 of a primary inductive device 6 which also includes a core 13. The primary inductive device 6 is mounted at the distal end of a movable support arm 12 of a positioning apparatus 7 which will be explained in detail on later part hereof. The control unit 16 has a control panel 17 with various control switches for controlling the operation of the positioning apparatus 7 and a display unit 18 providing various information and operating conditions during positioning and battery charging operations. The vehicle charger further includes a wireless receiver B2 which is communicable with the transmitter B1 on the vehicle 1. As shown in FIG. 1, the primary coil 14 is wound on the core 13 with the axis of the coil winding extending in the same direction as the secondary coil 4.

For battery charging, the movable primary inductive device 6, which will be referred to as a primary inductive charge coupler or the like hereinafter, is positioned in abutment relation to the stationary secondary inductive device 2, which will be referred to as a secondary inductive receptacle or the like hereinafter, with the axes of their coils 14 and 4 substantially in line with each other so that a magnetic circuit is formed thereby. In such a position of the primary inductive coupler and the secondary inductive receptacle, an electric current flows in the primary coil 14 to induce a secondary current in the secondary coil 2, which current is delivered through any appropriate circuit to the battery for charging the same in a well known manner to those skilled in the art.

Figure 3:
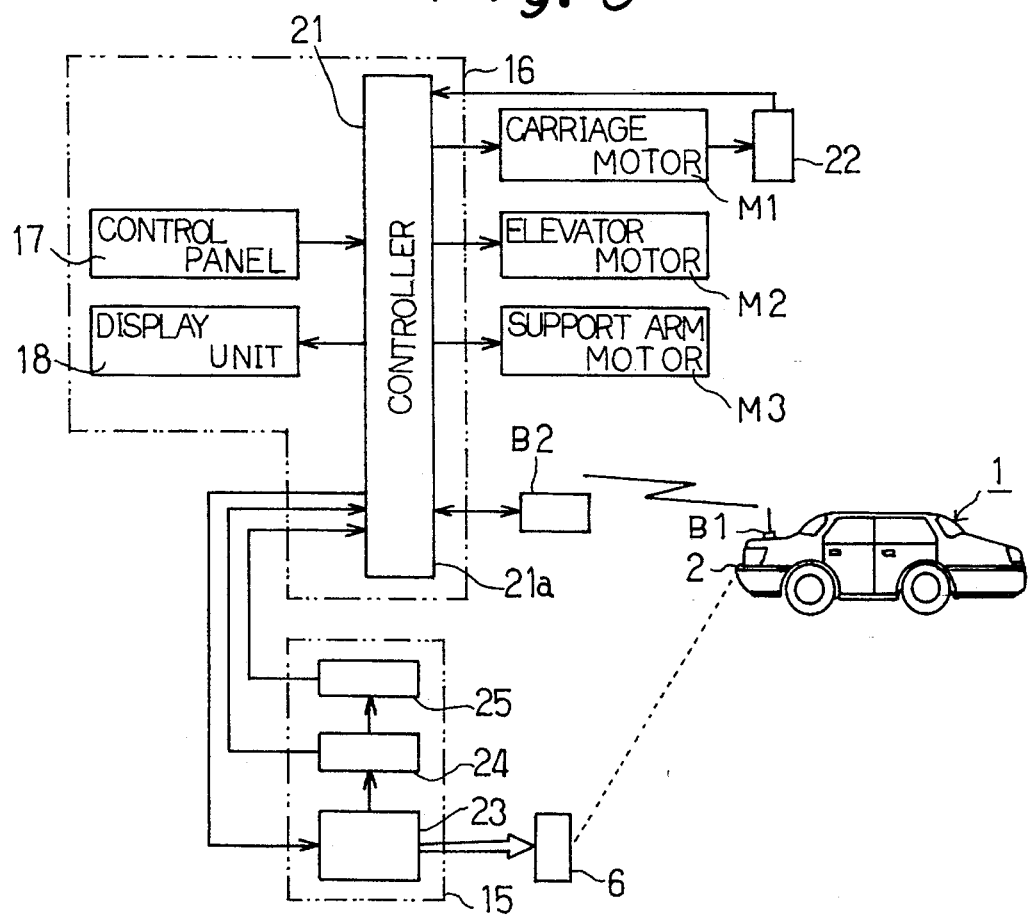
FIG. 3 is a block diagram illustrating a manner of controlling the positioning apparatus.

The apparatus 7 for positioning the primary inductive coupler 6 is disposed just behind the vehicle 1, and includes a carriage 9 movably supported on a pair of guide rails 8 secured on the garage floor and extending in a direction substantially perpendicular to the longitudinal direction of the vehicle 1 parked in the garage 5. The carriage 9 has a pillar 10 extending upright therefrom, an elevator 11 movably supported by the pillar, and a support art 12 supported by the elevator 11 and movable horizontally toward and away from the vehicle 1. As mentioned in the above, the arm 12 has mounted at its distal end the primary conductive coupler 6. As indicated in FIG. 3 the positioning apparatus 7 further includes motors M1, M2 and M3 for driving the carriage 6, elevator 11 and support arm 12, respectively. Normally, the carriage 9 is located at its leftmost position, the elevator 11 at its lowermost position and the support arm 12 at its retracted position, respectively.

For the sake of illustration of the embodiment, the direction of movement of the carriage 9 along the guide rails 8 is designated by an X-axis, the longitudinal direction of the vehicle 1 is depicted by a Y-axis, and the direction of movement of the elevator 11 along the upright pillar 10 is represented by a Z-axis, respectively, as indicated in FIGS. 1 and 2.

The following will describe the power source unit 15, the control unit 16 and their operations.

Referring to the diagram of FIG. 3, the control unit 16 includes a controller 21 having a memory 21a for storing therein data and information. The aforementioned control panel 17, display unit 18 and wireless receiver B2 are all connected to the controller 21. To the controller 21 are also connected the carriage motor M1, elevator motor M2 and support arm motor M3. The carriage motor M1 has a rotary encoder 22 for monitoring the angular speed of the motor M1 and generating to the controller 21 signals on the basis of which the controller figures out the travel of the carriage 9 along the guide rails 8 in the direction of the X-axis.

The power source unit 15 includes a power circuit 23 connected at the input thereof to the controller 21 and at the output to the primary coil 14 of the inductive coupler 6 for selectively supplying to the coil an AC charging current used for battery charging or an AC check current $I_{RMS}$ (see FIG. 4) utilized for locating an X-axis position of the primary inductive coupler 6. The power source unit 15 further includes a circuit 24 connected at the input thereof to the power circuit 23 for monitoring the current $I_{RMS}$ that the power circuit supplies to the primary coil 14 and generating to the controller 21 signals representing the monitored current, and also a circuit 25 connected at the input thereof to the monitoring circuit 24 for receiving therefrom the monitored current $I_{RMS}$ and generating to the controller 21 discriminating signals H and L depending on the magnitude of the current $I_{RMS}$. The electric current information received by the controller 21 is displayed on the display unit 18. The discriminating circuit 25 is operable only during the positioning mode operation of the controller 21. Electric current information generated by the circuits 24 and 25 to the controller 21 is shown on the display unit 18.

The following will describe the operation of the positioning apparatus 7 thus constructed.

When the electric vehicle 1 is parked in the garage 5 as shown in FIGS. 1 and 2, the wireless transmitter B1 on the vehicle transmits to the wireless receiver B2 a vehicle ID signal representing that vehicle 1. The wireless receiver B2 sends the ID signal to the controller 21, which in turn compares the ID signal with various ID numbers stored in its memory 21a to determine whether or not the vehicle 1 is registered. If the controller 21 determines that the vehicle 1 is not registered in the memory 21a, the controller will not cause the apparatus 7 to operate for positioning. Therefore, the carriage 9, the elevator 11 and the support arm 12 remain at their normal home positions.

If the electric vehicle 1 is accepted as a registered vehicle, the controller 21 is set in a positioning mode, generating to the power circuit 23 a positioning mode signal. In response to this signal, the power circuit 23 is activated to supply a check current $I_{RMS}$ to the primary coil 14 and the carriage motor M1 is started to move the carriage 9 at a constant speed along the guide rails 8 rightward as seen in FIG. 1. The monitoring circuit 24 monitors the check current $I_{RMS}$ flowing in the primary coil 14 and generates to the controller 21 and the discriminating circuit 25 signals indicative of the value of the current $I_{RMS}$ then flowing in the primary coil 14. The circuit 25 generates a discriminating H (high) or L (low) signal in response to the variation in the current $I_{RMS}$, as will be explained later.

Figure 4:
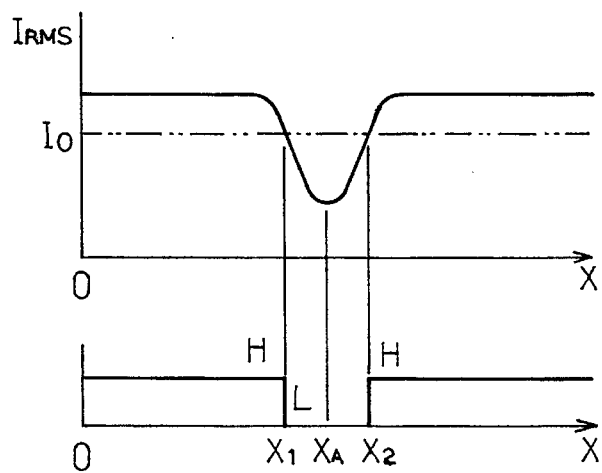
FIG. 4 is an illustrative diagram showing an electric current $I_{RMS}$ flowing in the coil of the primary inductive device and the output signals H and L generated to a controller during the positioning mode operation.

As the carriage 9 is being moved rightward, the spaced distance between the primary inductive coupler 6 and the secondary inductive receptacle 2 is reduced gradually and electromagnetic induction occurs between the coupler and the receptacle when the former coupler comes close to the latter receptacle. As a result, an electromotive force is induced in the secondary coil 4 and this induced force is increased with a decrease in the spaced distance. It is noted that, as the electromotive force due to the electromagnetic induction is increased, the check current $I_{RMS}$ flowing in the primary coil 14 is reduced by the amount corresponding to the current induced in the secondary coil 2, as shown in FIG. 4. Therefore, the value of the current $I_{RMS}$ becomes minimum when the primary inductive coupler 6 is positioned closest to, or in alignment along the X-axis with, the secondary inductive receptacle 2, as indicated at XA in FIG. 4. As the primary coupler 6 moves away from the secondary receptacle 2 from the above alignment position XA, the induced current in the secondary coil 2 is decreased and, accordingly, the value of the current $I_{RMS}$ is increased. Such change in the check current $I_{RMS}$ with the movement of the carriage 9 is illustrated in the diagram of FIG. 4. That is, the primary inductive coupler 6 can be considered to be in alignment with the secondary inductive receptacle 2 along the X-axis in the relative position thereof where the electromotive force induced in the secondary coil 4 becomes the greatest and hence the value of the current $I_{RMS}$ flowing in the primary coil 14 becomes the smallest.

On the other hand, the discriminating circuit 25 is operable to generate a high-level signal H while the value of the check current $I_{RMS}$ is greater than a predetermined reference value $I_0$ and a low-level signal L while the value $I_{RMS}$ is lower than the value $I_0$, as shown in FIG. 4, and these discriminating signals H, L are transmitted to the controller 21. As understood from the diagram of FIG. 4, reference symbol X1 represents a carriage position along the X-axis where the discriminating signal from the circuit 25 changes from H to L and X2 a carriage position where the discriminating signal changes from L to H, as measured from the home position of the carriage 9, respectively. Since the magnitude of the current $I_{RMS}$ varies with the function of the spaced distance between the primary coupler 6 and the secondary receptacle 2, the waveform of the current $I_{RMS}$ is symmetrical with respect to the alignment point XA and, therefore, the point XA where the primary inductive coupler 6 is positioned closest to the secondary inductive receptacle 2 is located at the midpoint between X1 and X2.

The controller 21 determines or measures the carriage position X1 on the basis of the number of pulses generated by the encoder 22 from the moment when the carriage motor M1 is started until the controller 21 receives from the circuit 25 a signal representing a change in the discriminating signal from H to L. The data of the X1 position is stored in the memory 21a of the controller 21. The carriage position X2 is also determined by the controller 21 from the number of pulses counted until the controller receives from the circuit 25 a signal representing a change in the discriminating signal from L to H. The data of the X2 position is also stored in the memory 21a of the controller 21.

After the primary inductive charge coupler 6 is moved further than the position X2 to reach a predetermined position along the X-axis, the controller 21 is operated to calculate the mid position XA in accordance with the equation expressed below.

$$XA=(X1=X2)/2$$

Subsequently, the controller 21 figures out the number of pulses necessary for the primary inductive coupler 6 to be brought back to the position XA and, simultaneously, the data of the necessary pulse count is stored in the memory 21a.

Then, the controller 21 operates the carriage motor M1 to move the carriage 9 leftward, as seen in FIG. 1, while counting pulses from the encoder 22 and, simultaneously, comparing the thus counted pulses with the above number of pulses stored in the memory 21a. The carriage motor M1 is stopped when the pulses from the encoder 22 has become equal to the stored pulse count. Thus, the primary inductive coupler 6 is brought to the XA position where the coupler is just aligned with the secondary inductive receptacle 2 along the X-axis.

After the primary inductive coupler 6 has been thus aligned with the secondary inductive receptacle 2, the vehicle driver operates any appropriate switch on the control panel 17 to drive the motor M2, thereby moving the coupler 6 slightly upward along the Z-axis so as to position the primary coupler 6 at the same elevation as the secondary receptacle 2 for true alignment thereof along both the X and Z axes. The driver then operates on the control panel 17 to drive the motor M3 to move the support arm 12 forward along the Y-axis until the primary coupler 6 is brought into contact with the secondary receptacle 2, thus the coupler positioning being completed and a magnetic circuit being formed by the primary coupler and the secondary receptacle.

With the primary coupler 2 and the secondary receptacle 6 engaged, the driver then operates on the control panel 17 to set the controller 21 in a battery charging mode. In response to such operation, the controller 21 causes the power circuit 23 to supply a charging AC current to the primary coil 14. In charging the battery, the AC current flowing in the primary coil 14 induces a similar current in the secondary coil 4 under the effect of electromagnetic induction and the AC current thus transferred from the primary to the secondary is rectified by any appropriate circuit into a DC current which is delivered to the battery for charging the same.

As it is now apparent from the foregoing description, the apparatus according to the above preferred embodiment permits the primary inductive coupler 6 to be positioned automatically along the X-axis with respect to the secondary receptacle 2. Therefore, the vehicle driver is freed from laborious parking operations in positioning the primary coupler with respect to the secondary receptacle. Because the positioning according to the invention is accomplished by utilizing the variation of the current $I_{RMS}$ flowing in the primary coil 14 of the inductive coupler 6, no external sensor or detector is required and the positioning apparatus can be made simple.

The alignment position XA to which the primary inductive coupler 6 should be brought for alignment can be figured out through a simple calculation wherein the sum of the two carriage positions X1 and X2, as measured from its home position, is just divided by two. To bring the primary coupler 6 to the position XA, the carriage motor M1 is rotated according to the information of a pulse count as determined with reference to the target position XA.

The controller 21 receives from the current monitoring circuit 24 signals representing an AC current flowing in the primary coil 14 for indication on the display unit 18. Therefore, the vehicle driver can monitor the current flowing to the primary coil 14 not only during positioning, but also during the battery charging operation.

The following will describe another preferred embodiment of the present invention with reference to FIGS. 6 through 14.

Figure 6:
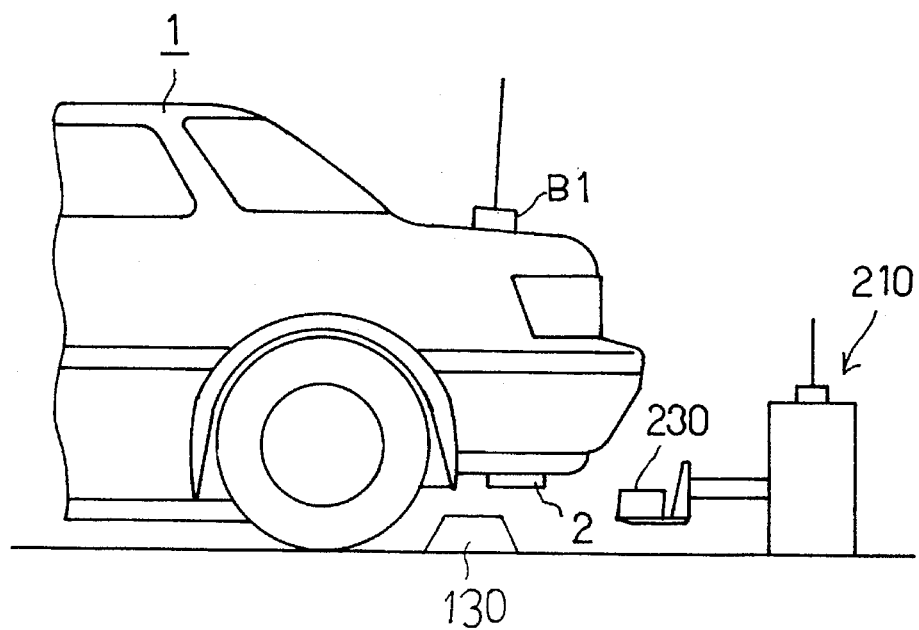
FIG. 6 is a side view showing an electric vehicle and a ground battery charger having therein a primary inductive device positioning apparatus constructed according to another preferred embodiment of the invention.
Figure 7:
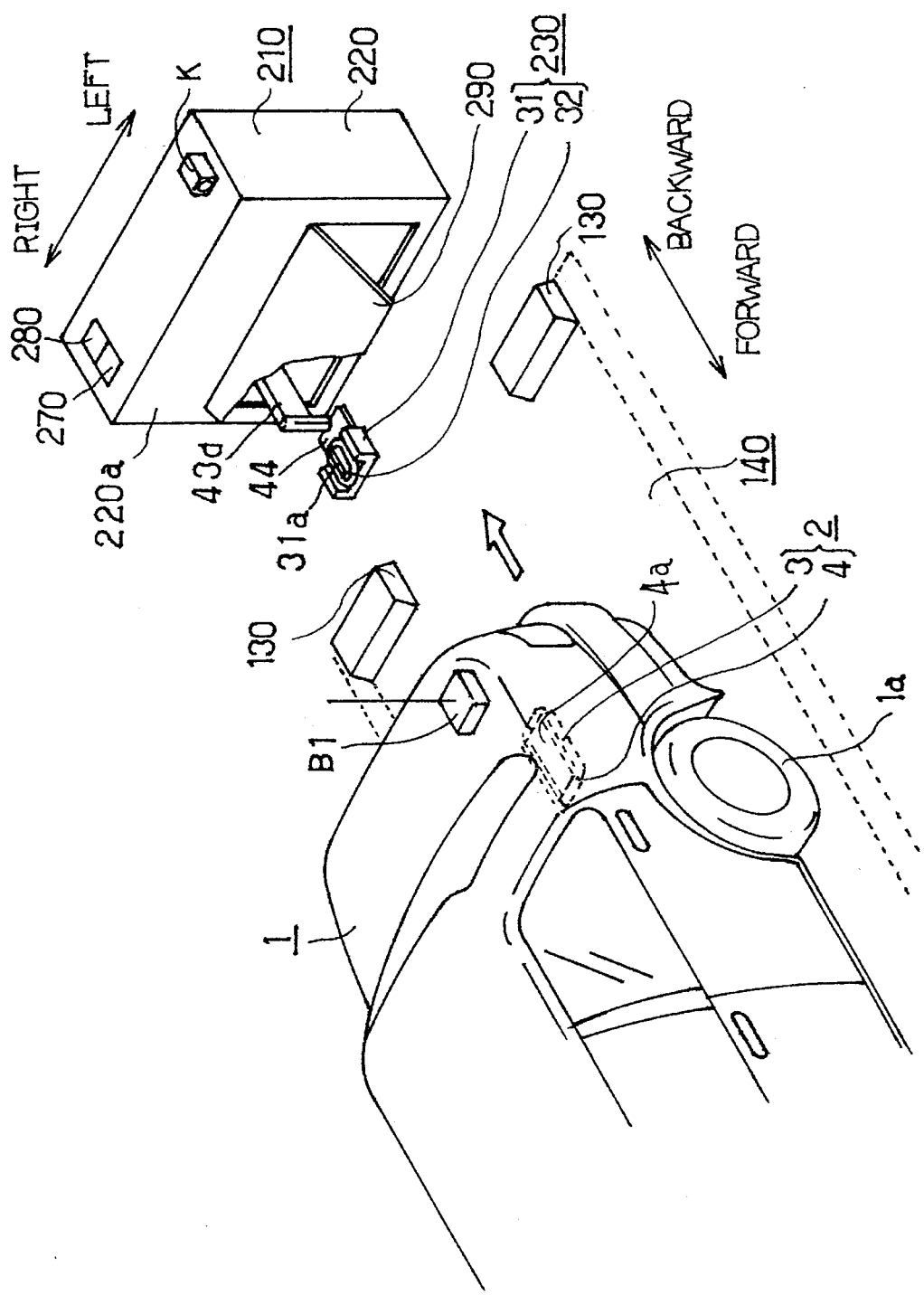
FIG. 7 is a perspective view of the vehicle and the battery charger of FIG. 6.

Referring to FIGS. 6 and 7, an electric vehicle 1 in a garage 140 has on the bottom adjacent the rear end and thereof a secondary inductive device or receptacle 2 comprised of a core 3 and a coil 4 connected to a battery of the vehicle through an appropriate electric circuit. The secondary core 3 is shaped in a flat plate and fixed to the bottom of the vehicle, while the secondary coil 4 is formed in an oval shape oriented with its major axis extending in the longitudinal direction of the vehicle 1 and defining an oval-shaped cavity 4a, and fixed to the bottom surface of the secondary core 3. The vehicle 1 further has a wireless transmitter B1. There is provided a pair of wheel stops 130 in the garage 140. In battery charging, the vehicle 1 to be charged is parked in the garage 140 with its rear wheels 1a placed in contact with the stops 130 as shown in FIG. 6.

Behind the stops 130 is located a ground battery charger 210 enclosed by a casing 220 and including a primary inductive device or coupler 230 comprised of a core 31 and a coil 32. The primary inductive coupler 230 is mounted on a plate 44 provided at one end of a support arm 43d of an apparatus 240 for positioning the coupler 230, which apparatus 240 will be explained in detail in a later part hereof. The charger 210 further includes a power source unit 250, a control unit 260 and a wireless receiver B2. On the casing 220 is provided an control panel 270 having various control switches, a display unit 280 and an alarm unit K. The control panel 270 and the display unit 280 form a part of the control unit 260.

Figure 9:
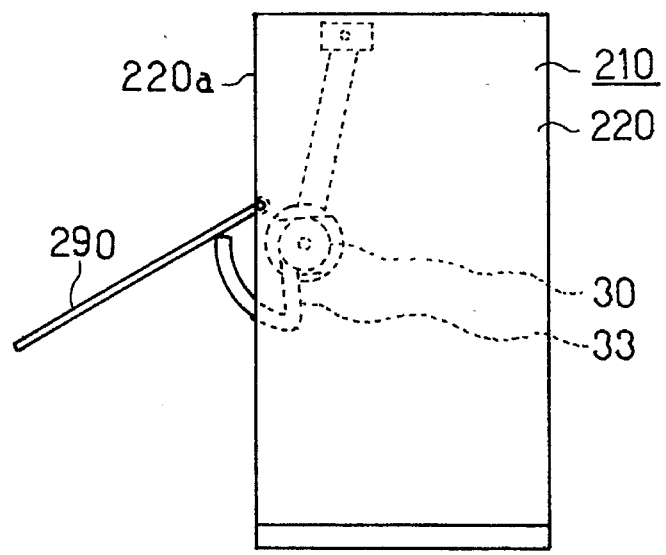
FIG. 9 is a side view of a casing enclosing the ground battery charger with the door of the casing swung open.
Figure 10:
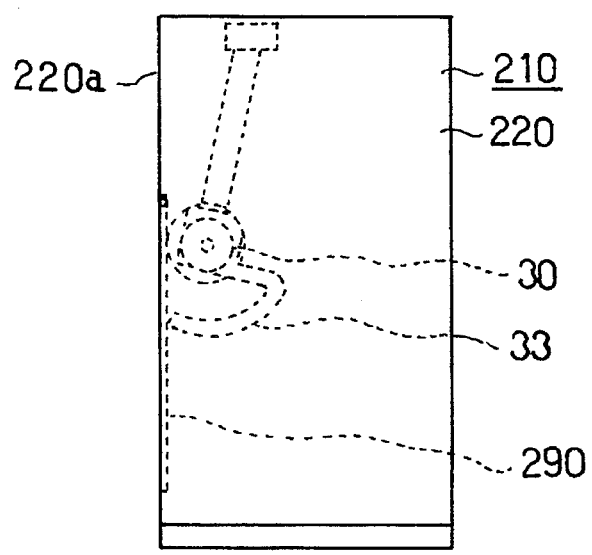
FIG. 10 is a side view of the casing of FIG. 9 with its door placed in its closed position.

As shown in FIGS. 9 and 10, the lower half of the front 220a of the casing 220 is formed as a swing door 290 which is hinged at its top and moved open by an arm 33 driven by a motor 30 in the casing 220. The motor 30 is connected to drive the arm 33 only for a limited opening of the swing door 290. That is, the door 290 can be swung from its closed position (FIG. 10) where the interior of the casing 220 is substantially enclosed to an open position (FIG. 9) where the door is positioned to provide a downward slope so that casing interior is protected from rail fall even when the door 290 is opened.

Figure 12:
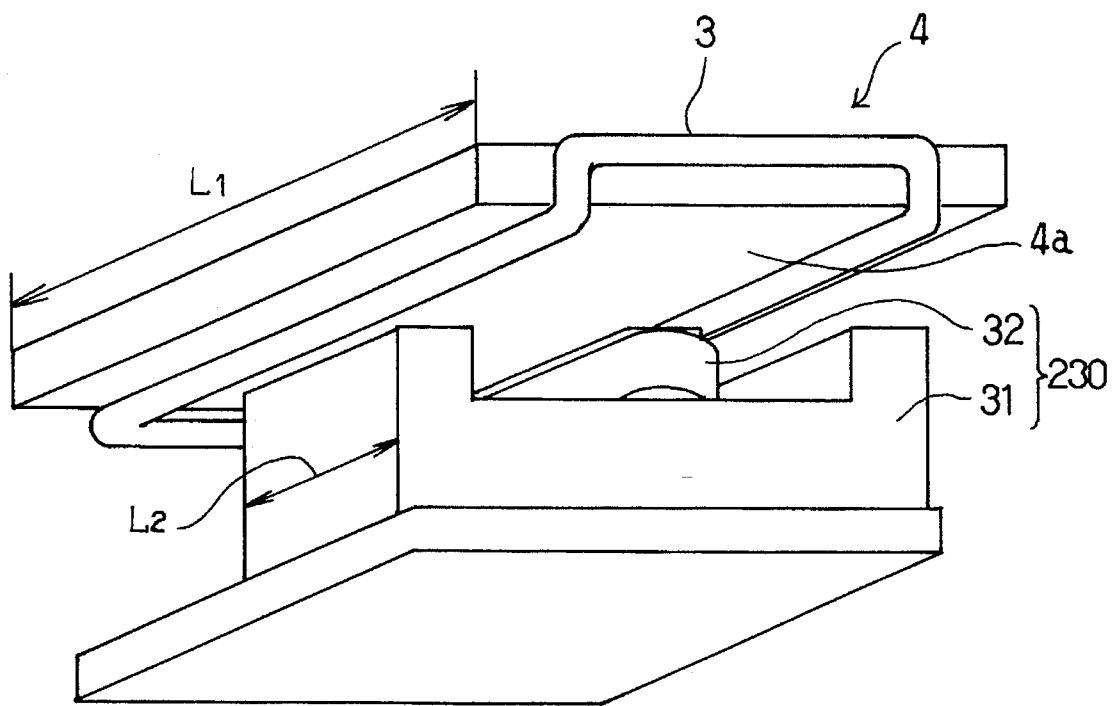
FIG. 12 is a perspective enlarged view of paired primary and secondary inductive devices.

The primary inductive coupler 230 includes a core 31 having an E-shaped cross section and fixed to the mounting plate 44 and a coil 32 wound around the center projection 31a of the E-shape core. As shown in FIG. 12, the primary coil 32 is also formed in an oval shape, but smaller than the cavity 4a of the secondary coil 4 so that the former coil may be accommodated within the cavity when the primary inductive coupler 230 is engaged with the secondary inductive receptacle 230 for form a magnetic circuit. That is, the dimension L1 of the cavity 4a as measured in the longitudinal direction of the vehicle 1 is substantially greater than the dimension L2 of the primary coil 32 as measured in the same direction, so that a space is formed between the primary and secondary coils on both sides thereof along the major axes of the oval shape.

Referring back to FIG. 8, the positioning apparatus 240 according to the present preferred embodiment is constructed so as to permit the primary inductive coupler 230 to move in X-axis across the longitudinal direction of the vehicle 1, vertical Z-axis and rotational θ-axis. It is to be noted that "right" and "left" referred to in the description of the present embodiment are defined as the respective sides as seen from a driver seated in the vehicle 1.

The apparatus 240 has an X-axis drive 41, Z-axis drive 42 and θ-axis drive 43. The X-axis drive 41 includes a pair of guide rails 41a disposed one above the other and extending along the X-axis, a screw rod 41b located between the paired guide rails 41a and extending in parallel thereto, a carriage 41d fixedly mounted on a slide block (not shown) and a nut (not shown either) engaged with the screw rod 41b so that rotation of the screw rod causes linear movement of the carriage 41d along the guide rails 41a. The drive 41 further includes a motor 41c having its output shaft connected to the screw rod 41b for rotating the same rod.

The Z-axis drive 42 includes a pair of vertical guide rails 42a fixed to the carriage 41d, a screw rod 42b disposed between the paired guide rails 42a, an elevator 42d fixedly mounted on a slide block (not shown) and a nut (not shown either) engaged with the screw rod 42b so that rotation of the screw rod causes vertical linear movement of the elevator 42d along the guide rails 42a. The Z-axis drive 42 further includes a motor 42c having its output shaft connected to the screw rod 42b for rotating the same.

The θ-axis drive 43 includes a support block 43a fixed to the Z-axis elevator 42d, a rotatable shaft 43b passed through a hole in the block 43a and supported therein by any suitable bearing (not shown), and a motor 43c fixed to the Z-axis elevator 42d and having its output shaft connected to the shaft 43b through a gearing G. The shaft 43b carries at its lower end the above-mentioned support arm 43d extending horizontally and having at its free end the mounting plate 44 on which the primary inductive coupler 23 is mounted. Thus, the support arm 43d is swung about the shaft 43b when the shaft is driven to rotate by the motor 43c.

Figure 8:
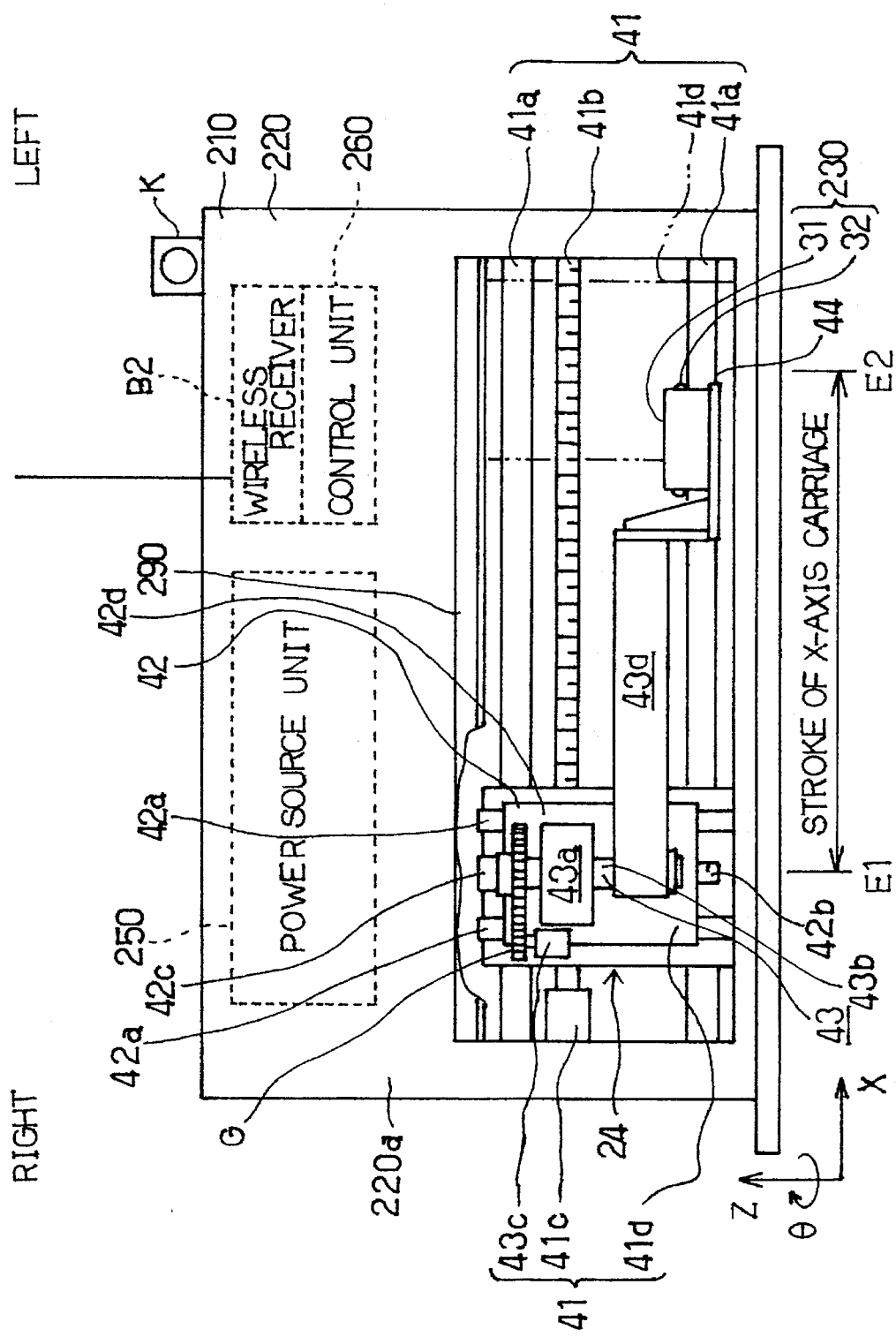
FIG. 8 is a front view of the primary inductive device positioning apparatus.

In the above positioning apparatus 240, the carriage 41d is movable along the X-axis over a predetermined distance of stroke defined by the right-hand side stoke end E1 and the opposite left-hand side stroke end E2, as shown in FIG. 8. The elevator 42d is movable along the Z-axis over a predetermined length of stroke. Normally, the X-axis carriage 41d is located at its right-side stroke and E1 and the Z-axis elevator 42d at its lowermost position, respectively. The support arm 43 is swung by the Z-axis motor 43c for an angle of about 90° from its normal retracted position where the arm is housed within the casing 220 substantially in parallel with the X-axis, to its operative position, as shown in FIG. 11, where the arm 43 projects out of the casing 220 and extends substantially perpendicularly to the X-axis.

In positioning the primary inductive coupler 230 prior to the battery charging operation, firstly the support arm 43 is swung out of the casing 220 and then carriage 41d is moved along the X-axis to bring the primary inductive coupler 230 on the support arm 43d to the alignment position where the coupler is positioned just below the secondary receptacle 2 in facing relation to one another, as shown in FIG. 12. After this alignment position is attained, the elevator 42d is moved upward until the primary core 31 is brought into contact with the secondary core 3 and the primary coil 32 placed within the cavity 4a defined by the secondary coil 4.

Figure 11:
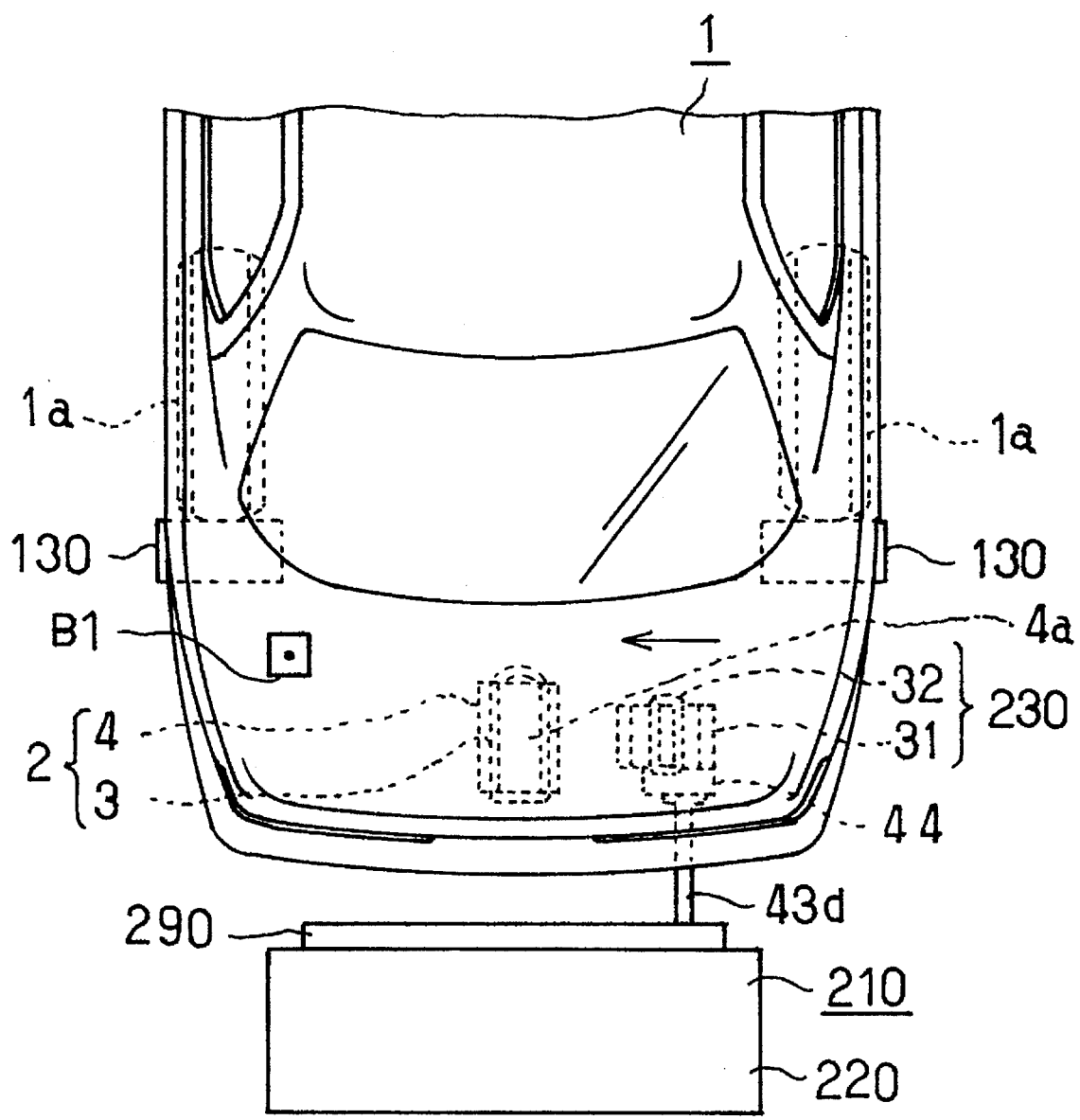
FIG. 11 is a top view showing a state where the vehicle is parked in the garage and the primary inductive device is set ready for positioning.

In order to make possible the above positioning of the primary coupler 230 with respect to the secondary receptacle 2, the stops 130 in the garage 140 are positioned at such a spacing from the battery charger 210 that, when the vehicle 1 is parked in contact with the stops 130, the secondary receptacle 2 is positioned substantially at the same spacing, for example, from the front 220a of the casing 220 as the primary coupler 230 which is then swung out to its operative position, as seen in FIG. 11. Furthermore, the stops 130 are arranged at such positions along the X-axis that, when the vehicle 1 is parked against the stops, the secondary inductive receptacle 2 carried by the vehicle is placed within the stroke range of the carriage 41d between E1 and E2, or the range of movement along the X-axis of the primary coupler 230.

Figure 13:
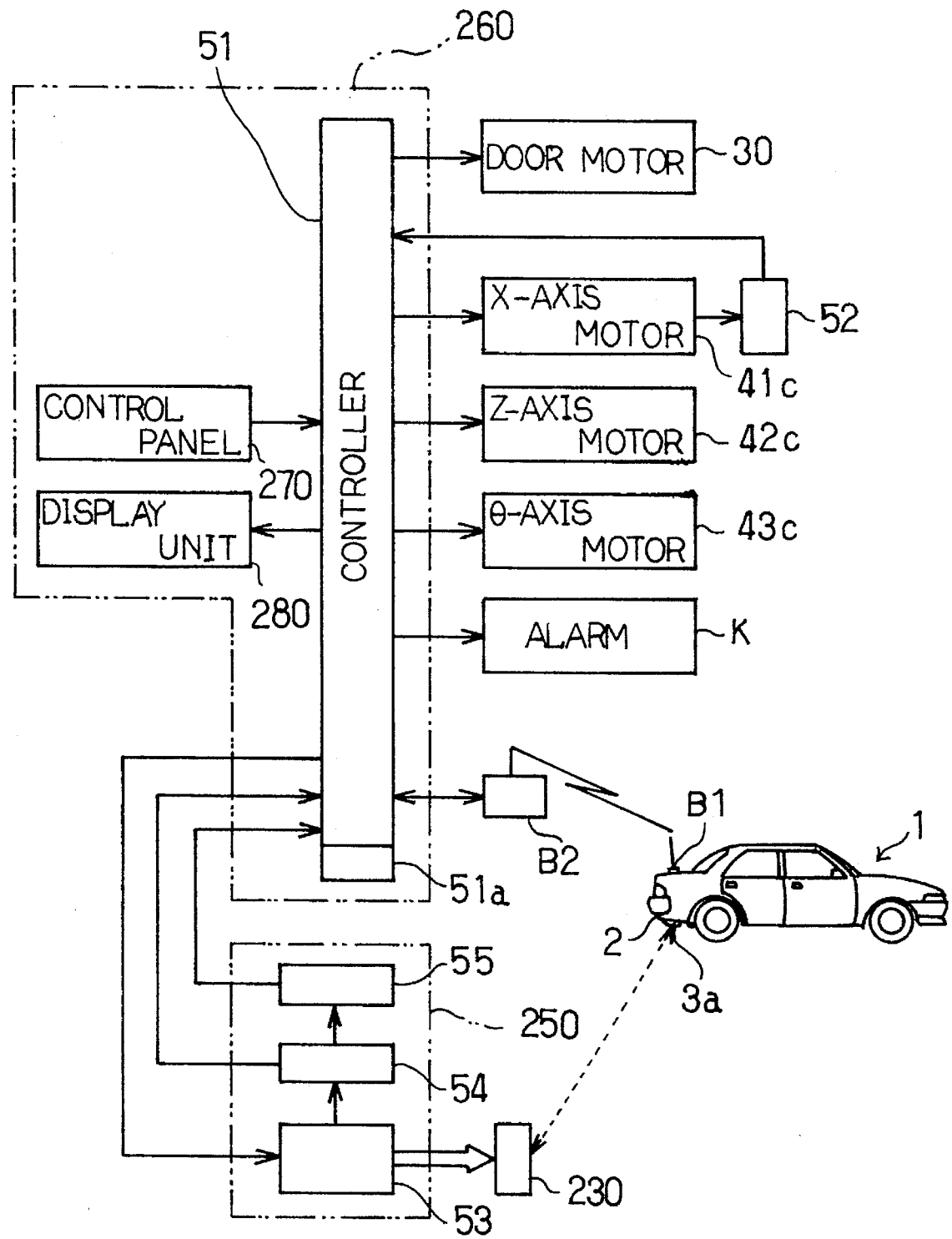
FIG. 13 is a block diagram illustrating a manner of controlling the positioning apparatus.

Referring now to FIG. 13, the control unit 260 includes a controller 51 having therein a memory 51a. The aforementioned control panel 270, display unit 280 and wireless receiver B2 are all connected to the controller 51. To the controller 51 are also connected the door motor 30, X-axis motor 41c, Z-axis motor 42c and θ-axis motor 43c. The X-axis motor 41c has a rotary encoder 52 for monitoring the angular speed of the motor and generating to the controller 51 signals on the basis of which the controller figures out the travel of the carriage 41d in along the X-axis. The alarm K is also connected to the controller 51 and energized in response to a signal generated by the controller depending on the parking condition of the vehicle, battery charging condition, etc.

As shown in the diagram, the power unit 250 has a power circuit 53 connected to the controller 51 and also to the primary coil 32 of the inductive coupler 230 for selectively supplying to the coil an electric current for battery charging and an AC check current $I_{RMS}$ utilized for locating an X-axis position of the primary inductive coupler 230. The power source unit 250 further includes a circuit 54 connected at the input thereof to the power circuit 53 for monitoring the current $I_{RMS}$ flowing in the primary coil 32 and generating to the controller 51 signals representing the monitored current, and also a circuit 55 connected at the input thereof to the monitoring circuit 54 for receiving therefrom the monitored current $I_{RMS}$ and generating to the controller 51 discriminating signals H and L depending on the magnitude of the current $I_{RMS}$. The electric current information received by the controller 51 is displayed on the display unit 280. Electric current information generated by the circuits 24 and 25 to the controller 21 is shown on the display unit 18.

Figure 14:
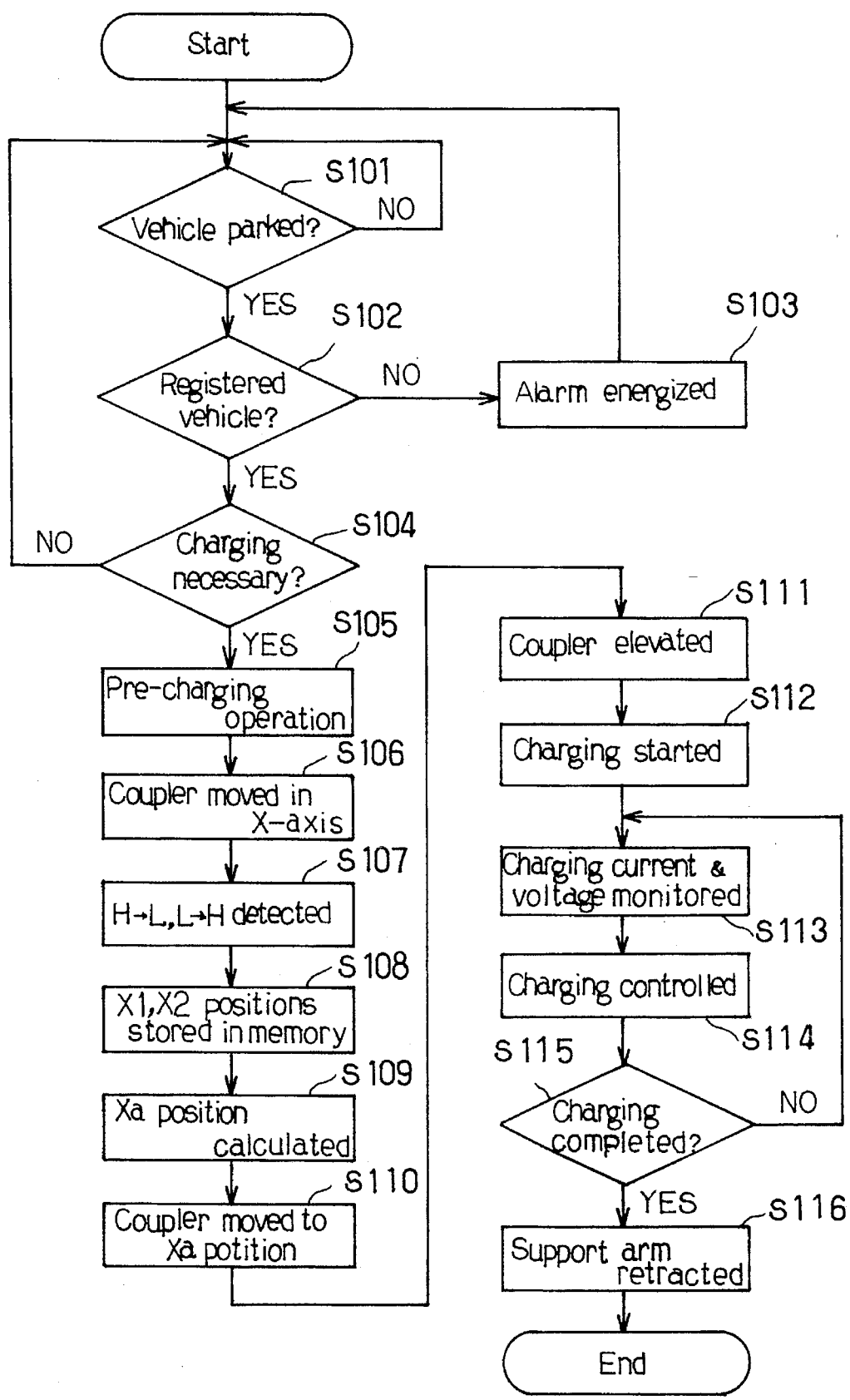
FIG. 14 is a flow chart illustrating the operation of the positioning apparatus.

The following will describe the operation of the above-described positioning apparatus 240 with reference to the control program shown in the form of a flow chart in FIG. 14. Prefix S followed by three-digit number in the flow chart means a step referred to in the specification.

The vehicle 1 is parked in the garage 140 with its rear wheels 1a in contact with the stops 130, as shown in FIG. 11, and the driver then shifts the change lever to its parking position. In so doing, the wireless transmitter B1 on the vehicle 1 transmits to the ground wireless receiver B1 a parking signal, an ID number signal and a signal representing the condition of the battery on the vehicle 1.

In response to the parking signal, the controller 51 recognizes at the step S101 that the vehicle 1 has been parked properly. Responding to the ID number signal, the controller 51 compares the signal with ID numbers stored in its memory 51a to determine whether or not the vehicle 1 is registered. If the ID number signal fails to correspond to any of the stored ID numbers, the controller 51 energizes the alarm K at the step S103 to inform the driver that the vehicle is not registered and the control program returns to the start. The positioning apparatus 240 remains inoperative and, therefore, no battery charging operation is performed. If the vehicle ID number signal is accepted by the controller 51, the control program proceeds to the step 104 where the controller 51 determines on the basis of the battery condition signals transmitted from the wireless transmitter B1 whether or not battery charging of the parked vehicle 1 is necessary. If the controller 51 determines that battery charging is unnecessary, the control program returns to the start and a battery charging operation is not performed. If the controller 51 finds the battery discharged to an extent that recharging is necessary, the program proceeds to the next step S105.

At the step S105, pre-charging operations are performed by the driver manually operating appropriate switches on the control panel 270. Firstly the motor 30 is driven to swing the door 290 open and, subsequently, the θ-axis motor 43c is activated to swing the support arm 43d from its retracted position within the casing 220 to its projecting operative position. Therefore, the primary inductive coupler 230 carried at the end of the support arm 43d is brought to its rightmost, operative home position at E1 along the X-axis below the vehicle bottom as shown in FIG. 11. When the primary inductive coupler 230 is thus swung out to the operative home position E1, the controller 51 is set in a positioning mode, generating to the power circuit 53 a positioning mode signal. In response to this signal, the power circuit 53 is activated to supply a check current $I_{RMS}$ to the primary coil 32 of the inductive coupler 230. It is noted that the pre-charging operations including swinging the door 290 open and swinging the support arm 43d to its operative position may be performed automatically from command signals generated by the controller 51 after the step S104.

When the pre-charging operations are over, the controller 51 starts the X-axis motor 41c at the step S106 to move the support arm 43d leftward from its operative home position E1 at a constant speed. As in the first preferred embodiment, the circuit 54 monitors the check current $I_{RMS}$ flowing in the primary coil 32 and the circuit 55 produces a high-level signal H while the value of the check current $I_{RMS}$ is greater than a predetermined reference value $I_0$ and a low-level signal L while the value $I_{RMS}$ is lower than the value $I_0$, as already described with reference to the diagram of FIG. 4. Simultaneously, the monitoring circuit 54 generates to the controller 51 signals representative of the magnitude of the current $I_{RMS}$ and the circuit 55 generates to the controller a signal representing the H or L signal according to the variation in the current $I_{RMS}$.

During the movement of the carriage 41d, and hence the primary inductive coupler 230, from the home position at E1 to the opposite leftmost position at E2, the controller 21 monitors the coupler position along the X-axis on the basis of the number of pulses produced by the encoder 52 to detect the coupler positions where changes occur in the signal from H to L and vice versa, at the step S107, and the coupler positions X1 and X2 corresponding to the H-to-L and L-to-H changes (FIG. 4) are stored in the memory 51a at the step S108.

At the step S109 after both positions X1 and X2 are stored and the support arm 43d has reached the stroke end E2, the controller 51 calculates the number of pulses necessary for the primary inductive coupler 230 to be brought back to the position XA according to the same equation as used in the first preferred embodiment and, simultaneously, the data for the necessary pulse count is stored in the memory 51a.

At the next step S110, the controller 51 operates the X-axis motor 41c to move the carriage 41d leftward while counting pulses from the encoder 52 and, simultaneously, comparing the thus counted pulses with the above number of pulses stored in the memory 51a. The X-axis motor 41c is stopped when the pulses from the encoder 52 has become equal to the stored pulse count. Thus, the primary inductive coupler 230 is brought to the target position XA where the coupler is just aligned with the secondary inductive receptacle 2 along the X-axis.

After the primary coupler 230 has been brought to the alignment position XA, the controller 51 starts the Z-axis motor 42c at the step S111 to move the elevator 42d upward to a predetermined position where the primary inductive coupler 230 is engaged with the secondary receptacle 2 with the primary coil 32 accommodated within the cavity 4a defined by the secondary coil 4, thus the coupler and receptacle being set in an inductively coupled condition ready for the battery charging operation. Because the dimension L1 of the cavity 4a is much greater than the dimension L2 of the primary coil 32 (FIG. 12), as long as the vehicle is parked with its rear wheels 1a in contact with the stops 130, the primary coil 32 can be accommodated safely within the cavity 4a even if the vehicle 1 is parked with a slight error in its longitudinal direction.

At the next step S112, the driver operates an appropriate switch on the control panel 170 to generate a charging mode signal to the power circuit 53, which, then responding to the signal from the controller, starts to supply a charging current to the primary coil 32 of the inductive coupler 230, thereby initiating the battery charging operation.

During the battery charging operation, the primary current flowing in the primary coil 32 and secondary current induced in the secondary coil 4, as well as the voltages applied across the respective coils, are monitored at the step S113 for displaying information thereof on the display unit 280. Information regarding the secondary induced current and voltage can be provided to the controller 51 through wireless communication between the transmitter B1 and receiver B2. As indicated by the step S114, the controller 51 controls the battery charging operation by controlling the primary current or voltage so that a secondary current of a constant value flows in the secondary coil 4 at different stages during the charging operation.

At the step S115, the controller 51 determines whether or not the battery charging operation is completed. If no charging-completed signal is received from the vehicle 1, the steps S113 and S114 are continued. If the signal is verified by the controller 51, the control program goes to the next step S116.

At step S116, post-charging operations are performed. That is, firstly the Z-axis motor 42c is started to move the elevator 42 to its lowermost position, which is followed by operating the X-axis motor 41c to bring the carriage 41d back to its home position at E1. Then, the θ-axis motor 43c is started to swing the support arm 43b back to its retracted position within the casing 220. Thus, the primary inductive coupler 230 mounted on the support arm 43d is moved back to its normal retracted position within the casing 220. Finally, the door 290 is closed by the motor 30.

According to the above-described preferred embodiment, since the primary inductive coupler 230 is initiated to move along the X-axis from its home position at E1, the range of permissible distance along the X-axis within which the vehicle should be parked can be widened and, therefore, the parking operation by the driver can be facilitated. The primary inductive coupler 230 mounted at the end of the swing support arm 43d can be brought to the above home position E1 rapidly merely by swinging the arm to its operative position.

The provision of the casing 220 is effective to protect its interior electric equipment from the ingress of foreign matter. Even during operation of the apparatus when the casing 220 is opened, its door 290 provides a slope to guide the rain downward without entering into the interior.

While the invention has been described with reference to the specific preferred embodiments, it is to be understood that the present invention can be practiced in further changes and modifications without departing from the spirit or scope thereof, as exemplified below.

The present invention is not limited only to automatic positioning. Since the check current $I_{RMS}$ can be recognized on the display unit, the driver may manually position the primary inductive coupler with respect to the secondary inductive receptacle by operating appropriate switches on the control panel while observing the variation in the current $I_{RMS}$ shown on the display unit 18.

As understood easily from the description of the embodiments, the principle of automatic positioning of the primary coupler along the X-axis utilizing a current $I_{RMS}$ may be applied also to the positioning along the Z-axis in the first preferred embodiment. In this case, the positioning along the Z-axis is performed only after the positioning along the X-axis is completed.

The controller may have in its memory data of the reference current $I_0$, so that the controller compares the current $I_{RMS}$ monitored by the circuit 24 or 54 with $I_0$ in the memory to determine the carriage positions X1 and X2. By so arranging, the circuit 25 or 55 for producing the discriminating signals may be dispensed with and, therefore, the power source unit can be made simpler.

To further facilitate the positioning operation in the first preferred embodiment, the controller may include in its memory data of elevation or height of the primary inductive coupler, as measured from the garage floor, of each vehicle registered by ID number. In moving the elevator, the controller can control the elevator motor M2 according to the height information so that the coupler is brought automatically into alignment with the receptacle along the Z-axis without intervention of manual operation by the driver.

As the X-axis carriage motor, a pulse motor may be used in conjunction with a pulse counter connected to the motor so that the positions X1 and X2 along the X-axis are determined from the pulses generated by the motor and counted by its counter. In this case, the encoder may be omitted.

Furthermore, the controller may so arranged that it is operable to determine the position XA without the aid of the positions X1 and X2, but by directly detecting the minimum value of the current $I_{RMS}$. By so arranging, the reference level of current $I_0$ need not be established and the circuit 25 or 55 may be omitted and, therefore, the power source unit and the controller can be made simpler.

Figure 5:
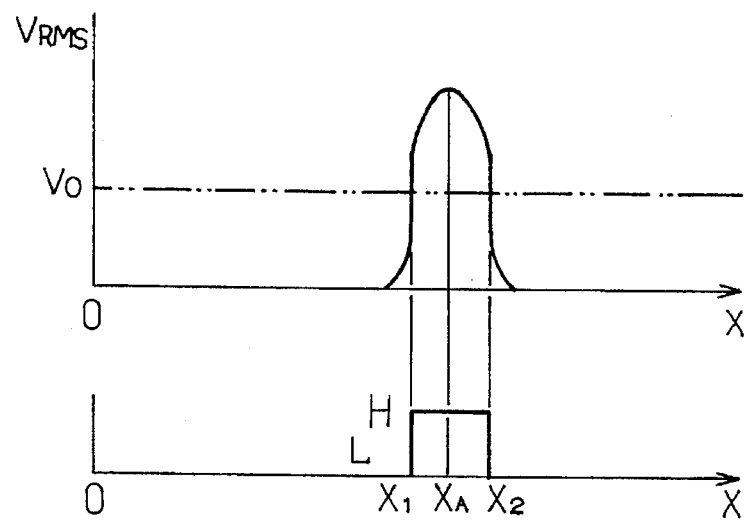
FIG. 5 is an illustrative diagram showing a voltage $V_{RMS}$ induced across the coil of a secondary inductive device and output signals H and L generated to the controller during the positioning mode operation in a modified embodiment of the invention.

In the above-described preferred embodiments, an electric current $I_{RMS}$ flowing in the primary coil is monitored to determine the positions X1 and X2 on the basis of which the position XA is calculated. It is noted, however, that the positions X1 and X2 may be determined by monitoring a voltage $V_{RMS}$ which is induced across the secondary coil on the vehicle by application of an AC voltage across the primary coil, as indicated in the diagram of FIG. 5. In such an embodiment, the vehicle has an electric circuit connected to the secondary coil for monitoring the voltage $V_{RMS}$ and another circuit connected to the voltage monitoring circuit for generating discriminating signals H and L depending on the magnitude of the voltage $V_{RMS}$ with respect to a predetermined reference voltage $V_0$, as shown in the diagram of FIG. 5. Since the above two circuits are installed on the vehicle, the signals H, L are provided to the controller by the wireless transmitter and receiver B1, B2. The controller 21 will determine the positions X1 and X2 from the signals H and L and then calculate the position XA in the same manner as used in the above-described preferred embodiments. As a further modification, the controller may have in its memory data of the reference voltage $V_0$, so that the controller compares the voltage $V_{RMS}$ with $V_0$ in the memory to determine the positions X1 and X2 and then figures out the position XA. In such a case, the circuit for generating the discriminating signals H, L may be omitted.

As a further modification, a current may be flown in the secondary coil on the vehicle 1 so that variation in the induced current or voltage in the primary coil is monitored by any suitable means, thereby determining the position X1 and X2. In this case, it is necessary for the electric vehicle 1 to have a power source supplying the current to the secondary coil.

The second preferred embodiment does not necessarily have a device for monitoring the change of current in the primary coil, but it may use a sensor such as a photoelectric type mounted on the support arm 43d for detecting a mark on the secondary coupler, so that the primary coupler is moved to the target position XA based on a signal generated by the sensor.

In the second preferred embodiment, the carriage 41d is moved from the right-hand side stroke end E1 to the opposite left-hand side stroke end E2 and them moved back to the position XA after that position is calculated by the controller. However, the carriage does not travel all the way to the stroke end E2, but it may be stopped after moving past a position where X2 is determined and then moved back to the calculated target position XA.

The swing type support arm 43d in the second preferred embodiment may be substituted with an arm carrying at its distal end the primary inductive coupler and constructed so as to be extensible linearly toward and away from the vehicle. Since the primary inductive coupler mounted on such extensible support arm is adjustable in the longitudinal direction of the vehicle, the vehicle need not be parked precisely for battery charging in its longitudinal direction and the positioning apparatus can bring the coupler to a secondary inductive receptacle mounted at a different or remote position on the vehicle bottom. Positioning of the primary coupler in the vehicle longitudinal direction may be conducted in the same method as in the positioning along the X-axis. The use of such extending type support arm is advantageous in that the space in the casing 220 can be saved.

What is claimed is:

1. Method of charging a battery of an electric vehicle by coupling a primary inductive device having a core and a primary coil with a secondary inductive device having a core and a secondary coil and carried by the electric vehicle, said primary inductive device being movable for positioning thereof relative to said secondary inductive device, said method comprising:

supplying an electric power to one of said primary and secondary coils;

moving said primary inductive device relative to said secondary inductive device so that a variable electromotive force is induced in the other of said primary and secondary coils;

monitoring a change of electric power in one of said primary and secondary coils; and stopping said primary inductive device at a position where said primary inductive device is located substantially closest to said secondary inductive device on the basis of information of said change of electric power.

2. Method of charging a battery of an electric vehicle according to claim 1, wherein said primary inductive device is movable in three dimensional directions.

3. Apparatus for charging a battery for an electric vehicle by coupling a primary inductive device having a core and a primary coil with a secondary inductive device having a core and a secondary coil and carried by the electric vehicle and then flowing a charging current in said primary coil thereby to induce an electromotive force in said secondary coil, said apparatus comprising:

means for supplying electric power to one of said primary and secondary coils;

means for moving said primary inductive device relative to said secondary inductive device so that a variable electromotive force is induced in the other of said primary and secondary coils;

means for monitoring a change of electric power in one of said primary and secondary coils; and means for controlling said moving means on the basis of information of said change of the electric power so that said primary inductive device is stopped at a position where said primary inductive device is located substantially closest to said secondary inductive device.

4. Apparatus for charging a battery of an electric vehicle according to claim 3, said moving means including first moving means for moving said primary inductive device in a first direction, second moving means for moving said primary inductive device in a second direction other than said first direction and a third moving means for moving said primary inductive device in a third direction other than said first and second directions, and said control means including first control means for controlling the operation of at least one selected means of said first, second and third moving means so that said primary inductive device is stopped at said closest position and second control means for controlling the operation of the moving means other than said at least one selected moving means so that said primary inductive device is brought into an inductively coupled condition with respect to said secondary inductive device.

5. Apparatus for charging a battery of an electric vehicle according to claim 3, said supplying means supplying an electric current to said primary coil, and said monitoring means monitoring a change of an electric current flowing in said primary coil.

6. Apparatus for charging a battery of an electric vehicle according to claim 5, wherein said substantially closest position is calculated by said controlling means on the basis of two positions of said primary inductive device relative to said secondary inductive device where the current flowing in said primary coil becomes greater and smaller than a predetermined level of electric current, respectively.

7. Apparatus for charging a battery of an electric vehicle according to claim 3, said supplying means supplying a voltage to said primary coil, and said monitoring means monitoring a change of voltage across said primary coil.

8. Apparatus for charging a battery of an electric vehicle according to claim 7, wherein said substantially closest position is calculated by said controlling means on the basis of two positions of said primary inductive device relative to said secondary inductive device where the voltage across said primary coil becomes greater and smaller than a predetermined level of voltage, respectively.

9. Method for charging a battery of an electric vehicle by inductively coupling a primary core-coil device with a secondary core-coil device carried by the electric vehicle, said primary device being movable relative to said secondary device over a distance of stroke defined by two opposite stroke ends for positioning of said primary device at a position within said distance of stroke where said primary device is substantially in alignment with said secondary device, said method comprising:

moving said primary device from one of said stroke ends toward the other;

monitoring the relative position between said primary and secondary devices while moving the primary device; and stopping said primary device at said alignment position.

10. Method of charging a battery of an electric vehicle according to claim 9, said monitoring being accomplished by monitoring a change of electric power in one of said primary and secondary coils, said change of the electric power being caused by a change of an electromotive force induced in the other of said primary and secondary coils which is in turn caused by a change in the relative position of said primary device relative to said secondary device.

11. Apparatus for charging a battery of an electric vehicle by coupling a primary core-coil device with a secondary core-coil device carried by the electric vehicle, said primary device being movable relative to said secondary device over a distance of stroke defined by two opposite stroke ends for positioning of said primary device at a position within said distance of stroke where said primary device is substantially in alignment with said secondary device, said apparatus comprising:

means for moving said primary device relative to said secondary device;

means for monitoring relative position between said primary and secondary devices while the primary device is being moved by said moving means; and control means for causing said primary device to initiate moving from one of said stroke ends.

12. Apparatus for charging a battery of an electric vehicle according to claim 11, said moving means comprising:

a support arm carrying at the distal end thereof said primary device;

means for swinging said support arm about the proximal end thereof thereby to move said primary device therewith;

first moving means for moving said support arm in a first horizontal direction perpendicular to the longitudinal direction of the vehicle; and second moving means for moving said support arm in vertical direction, and said control means comprising:

first control means operable when the proximal end of said support arm is positioned at said one stroke end for controlling the operation of said swinging means so as to move said support arm between a retracted position and an operative position thereof;

second control means for controlling the operation of said first moving means so as to cause said support arm to initiate moving from said one stroke end and also to stop at a position where said primary device is substantially in alignment with said secondary device; and third control means for controlling the operation of said second moving means so as to move said primary device into contact with said secondary device.

13. Apparatus for charging a battery of an electric vehicle according to claim 11, further comprising means for enclosing said moving means.

14. Apparatus for charging a battery of an electric vehicle according to claim 13, said enclosing means having a swing door hinged at its top and operable to open while said moving means is in operation, said door, when opened, providing a downward slope toward its end remote from the hinged end.

15. Apparatus for charging a battery of an electric vehicle according to claim 11, said monitoring means being operable to find said relative position by monitoring a change of electric power in one of said primary and secondary coils, said change of the electric power being caused by a change of an electromotive force induced in the other of said primary and secondary coils which is in turn caused by a change in the relative position of said primary device relative to said secondary device.

* * * * *

UNITED STATES PATENT AND TRADEMARK OFFICE
CERTIFICATE OF CORRECTION

PATENT NO. : 5,617,003
DATED : April 1, 1997
INVENTOR(S) : Odachi et al.

It is certified that error appears in the above-indentified patent and that said Letters Patent is hereby corrected as shown below:

```
Column 4, line 23, after "detail" change "on" to
--in a--; line 55, change "art" to --arm--; line 59,
after "Fig. 3" insert --,-- (comma).

Column 6, line 65, change "XA=(X1=X2)/2" to
--XA = (X1+X2)/2--.

Column 8, line 2, after "end" delete --and--.

Column 9, line 33, change "and" (first occurrence) to
--end--.

Column 14, line 14, change "them" to --then--; line 59,

Column 15, line 17, after "and" delete "a".
```

Signed and Sealed this

Twentieth Day of January, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.    : 5,617,003
DATED         : April 1, 1997
INVENTOR(S)   : Odachi et al.

It is certified that error appears in the above-indentified patent and that said Letters Patent is hereby corrected as shown below:

Column 4, line 23, after "detail" change "on" to --in a--; line 55, change "art" to --arm--; line 59, after "Fig. 3" insert --,-- (comma).

Column 6, line 65, change "XA=(X1=X2)/2" to --XA = (X1+X2)/2--.

Column 8, line 2, after "end" delete --and--.

Column 9, line 33, change "and" (first occurrence) to --end--.

Column 14, line 14, change "them" to --then--;

Column 15, line 17, after "and" delete "a".

This Certificate supersedes certificate of correction issued January 20, 1998.

Signed and Sealed this

Twenty-first Day of July, 1998

Attest:

BRUCE LEHMAN

*Attesting Officer*    *Commissioner of Patents and Trademarks*